United States Patent
Rönkkö

(10) Patent No.: US 6,560,458 B1
(45) Date of Patent: May 6, 2003

(54) METHOD FOR IDENTIFYING A CALL IN A TELECOMMUNICATIONS SYSTEM

(75) Inventor: Minna Rönkkö, Espoo (FI)

(73) Assignee: Nokia Corporation, Espoo (FI)

( * ) Notice: Subject to any disclaimer, the term of this patent is extended or adjusted under 35 U.S.C. 154(b) by 36 days.

(21) Appl. No.: 09/702,587

(22) Filed: Oct. 31, 2000

Related U.S. Application Data

(63) Continuation of application No. PCT/FI99/00478, filed on Jun. 1, 1999.

(30) Foreign Application Priority Data

Jun. 3, 1998 (FI) .................................................. 981260

(51) Int. Cl.[7] .............................................. H04Q 7/20
(52) U.S. Cl. ...................... 455/445; 455/415; 455/422; 379/219
(58) Field of Search .............................. 455/445, 415, 455/422, 450–452, 560, 436, 439, 518–520; 379/219, 220.1, 142.01, 142.04, 142.12, 127.01, 127.06

(56) References Cited

U.S. PATENT DOCUMENTS

| | | | | |
|---|---|---|---|---|
| 5,528,583 A | * | 6/1996 | Acampora et al. | 370/256 |
| 6,070,076 A | * | 5/2000 | Valentine | 455/436 |
| 6,128,377 A | * | 10/2000 | Sonnenberg | 379/211.02 |
| 6,233,450 B1 | * | 5/2001 | Seppanen | 455/426 |
| 6,292,479 B1 | * | 9/2001 | Bartholomew et al. | 370/352 |

FOREIGN PATENT DOCUMENTS

| | | |
|---|---|---|
| EP | 0676907 A3 | 10/1995 |
| FI | 941240 | 9/1994 |
| FI | 94700 | 6/1995 |
| FI | 98690 | 4/1996 |
| WO | WO 97/24007 | 7/1997 |
| WO | WO 97/50262 | 12/1997 |

OTHER PUBLICATIONS

International Search Report for PCT/FI99/00478.

* cited by examiner

*Primary Examiner*—William Trost
*Assistant Examiner*—Simon Nguyen
(74) *Attorney, Agent, or Firm*—Squire, Sanders & Dempsey L.L.P.

(57) ABSTRACT

A method, system and network node for identifying a call in a telecommunications system wherein the first identifier has been determined to be used on network interfaces for identifying the call in call messages associated with the call. In the method, to enable the call to be unambiguously identified in the whole network area, the network is divided into smaller sub-networks such that the first identifier used on the interface is unique in the sub-network area, a second identifier is determined to be used for identifying the call in the whole network area, one second identifier value is allocated to the call in connection with call setup, one or more fist value of the first identifier is allocated to the call in connection with call setup, each first identifier value is bound to a second identifier value, the second identifier value is replaced in the call messages with the first identifier value before the message is transmitted from the network via the interface, and the first identifier value received in the call messages via the interface is replaced with the second identifier value in the network.

14 Claims, 3 Drawing Sheets

METHOD FOR IDENTIFYING A CALL IN A TELECOMMUNICATIONS SYSTEM

Figure 1:
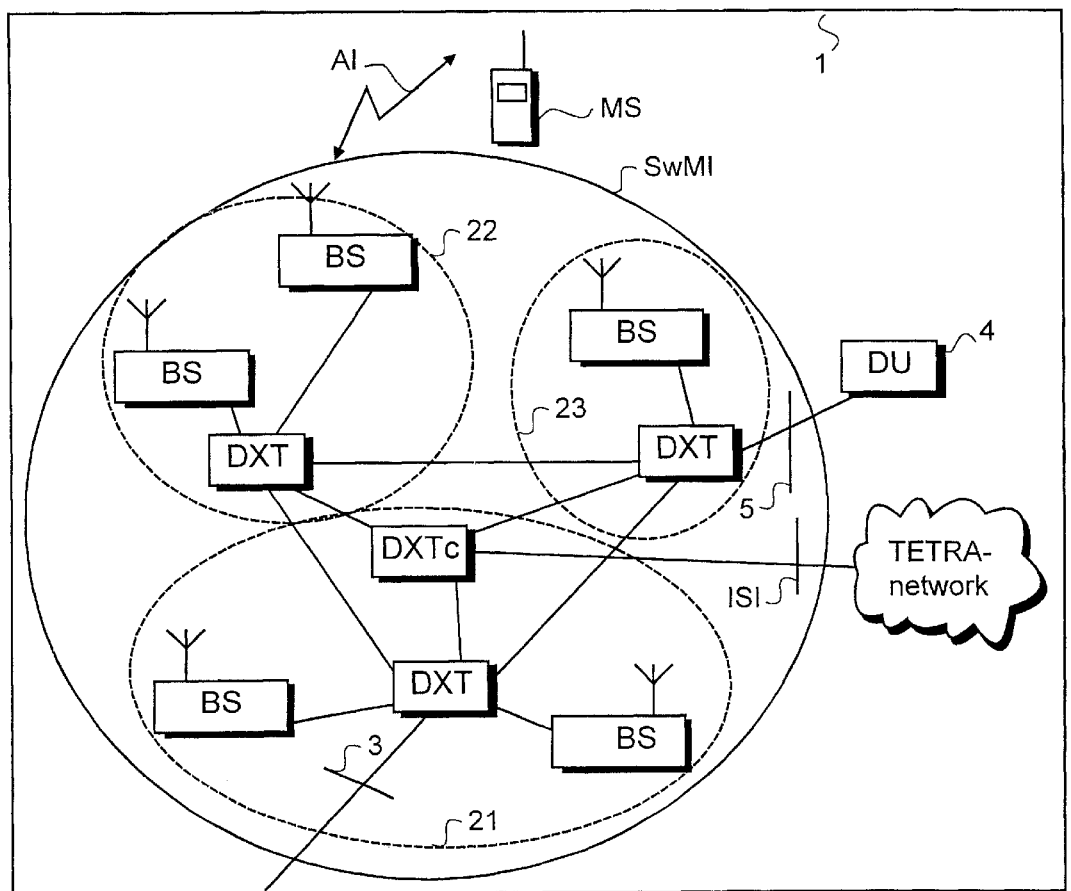

This application is a continuation of international application serial number PCT/FI99/00478, filed Jun. 1, 1999.

BACKGROUND OF THE INVENTION

The invention relates to identifying a call in a telecommunications system, and particularly to identifying a call in a system predetermining the length of an identifier identifying the call on an interface.

The latest mobile communication systems are designed to provide open interfaces between the different parts of the system. Such interfaces may include air interfaces and interfaces between two different networks. In connection with an open interface, functions taking place via the interface are clearly determined. For example, the system specifications define how a call is identified such that each subscriber receives calls that are only intended for him or her and the network knows which messages are associated with a certain call. In mobile communication systems, for example, a single message is identified as being associated with a certain call by means of the value of a call identifier included in the message. A mobile station only chooses those messages from the air interface that have the same call identifier value as the call identifier value the mobile station received in connection with call setup.

The problem with the arrangement described above is that the number space defined in the specifications for the call identifier used on open interfaces does not necessarily suffice to cover all calls occurring in the entire network area so as to provide each call with a unique, unambiguous identifier. For example the TETRA (Terrestrial Trunked Radio) standard established by ETSI (European Telecommunications Standards Institute) defines the length of the call identifier used on interfaces as 14 bits. If a network in accordance with the TETRA standard comprises 200 exchanges and the calls are evenly spread out over the whole network, each exchange has thus only about 80 identifiers available. Such a low number of identifiers is insufficient for an exchange that processes hundreds or thousands of calls simultaneously.

A solution to the above problem is to divide the network into smaller ones and use a unique network identifier for each network. Since the call identifier is network-specific, a call can be identified globally by means of the network identifier. Dividing the network into smaller ones by different network identifiers directly affects the users, however, because it is necessary to use network identifiers in connection with subscriber telephone numbers. Hence, despite the operator's preference for one large network only it in practice has a plurality of small networks.

BRIEF DESCRIPTION OF THE INVENTION

An object of the invention is thus to provide a method and an apparatus implementing the method so as to solve the above problems. The objects of the invention can be achieved with a method for identifying a call in a telecommunications system comprising at least one network and terminals, the system determining at least one interface for the network, the interface being connected with the terminals or other networks via the interface, and a first identifier that is used on the network interfaces for identifying the call in call messages associated with the call, the method being characterized by comprising the following steps: dividing the network into smaller sub-networks such that the first identifier used on the interface is unique in the sub-network area, determining a second identifier to be used for identifying the call in the whole network area, allocating one value of the second identifier to the call in connection with call setup, allocating one or more first values of the first identifier to the call in connection with call setup, binding each first identifier value to the value of the second identifier, replacing in call messages the value of the second identifier with the value of the first identifier before transmitting the message from the network via the interface, and replacing in the call messages received via the interface the value of the first identifier with the value of the second identifier in the network.

The concept 'first identifier' herein refers to an identifier defined in the system standards which is used on the network interfaces for identifying a call in call messages associated with the call.

The concept 'call message' herein refers to data transmitted via the interfaces and associated with the call. Within the scope of the present application, the concept 'data' should be understood in a wide sense to refer to any information transmitted in a digital telecommunications system. Such information may include signaling information, speech encoded into a digital form, data traffic between computers, telefax data, short program-code pieces and video image, etc.

The invention further relates to a system to which the method of the invention can be applied, the system comprising at least one network for receiving and transmitting call messages associated with a call, the network comprising first allocation means for allocating the first value of the first identifier in connection with call setup, the first identifier being used for identifying the call on an interface and the number space of the first identifier being predetermined, and transmission means for transmitting the first identifier to a terminal in connection with call setup, and terminals connected to the network via the interface and receiving in connection with call setup the first value of the first identifier from the network and transmitting to the network call messages associated with the call and equipped with the first identifier value and receiving from the network call messages, the first identifier value included in the messages being the same as the first identifier value in the terminal, the system being characterized by the first allocation means being arranged to allocate the first value of the first identifier to each terminal or group of terminals engaged in the call, the first values possibly differing from each other, and the network further comprising at least two sub-networks, the number space of the first identifier being sufficiently large in the area of the sub-networks to identify the calls on the interface, second allocation means for allocating a second identifier value from a number space determined for a second identifier in connection with call setup for identifying the call in the whole network, call control means for controlling the call and for collecting information about the call on the basis of the second identifier value, memory means for binding each first value to the second identifier value, replacement means for replacing the second identifier value in the call message with the first identifier value when the message is transmitted from the network to the terminal, and for replacing the first identifier value with the second identifier value in the call message received from the terminal.

The invention further relates to a network node which can be utilized in the method and system of the invention, the network node comprising at least one input channel and one output channel, reception means for receiving call messages associated with a call, and transmission means for transmitting the call messages associated with the call towards a target address, the network node being characterized by being arranged, in response to a call setup request received from a terminal, to allocate a first identifier value to each terminal or group of terminals engaged in the call in the network node area to be used for identifying the call on an interface between the network and the terminal, to allocate a second identifier value to the call for identifying the call in the network, to bind each first identifier value to the second identifier value, and to initiate call control using the second identifier value.

The invention is based on the idea of bringing into use, in addition to the call identifier used on an open interface, also an internal call identifier used in the network which is sufficiently long to identify all simultaneously ongoing calls in the network, and dividing the network into sub-networks having call identifiers that are unique inside the sub-networks. The internal call identifier is bound to the call identifier. Hence, two different identifiers—one internal identifier and one or more call identifiers—are associated with one call. The most significant advantage of the invention is that the length of the call identifier does no longer restricts the size of a network, since ail on-going calls in the network can be identified by means of the internal call identifier. The length of the internal identifier can be freely determined by the operator when the network is being built. In addition, the operator can readily change the sub-network division according to network load. A further advantage of the invention is that the invention can be applied to existing networks only by changing the network control software. Open interface messages can remain unchanged.

In a preferred embodiment of the invention a new first identifier value is allocated to a terminal in connection with call setup. This has the advantage that a mobile station can freely move in the area of different sub-networks and the call can be identified regardless of the sub-network being changed.

In another preferred embodiment of the invention the first identifier values are allocated to the different sub-networks such that the values of adjacent sub-networks differ from each other. This is to ensure that the terminal does not receive call messages intended for another terminal in connection with handover before receiving a new first identifier value. It is further ensured that messages transmitted by the terminal do not end up in the call control processes of another call in the system; this is possible if the same first identifier value is used in adjacent sub-networks.

Preferred embodiments of the method, system and network node of the invention are disclosed in the attached dependent claims 2 to 7, 9 to 12 and 14.

LIST OF DRAWINGS

Figure 4:
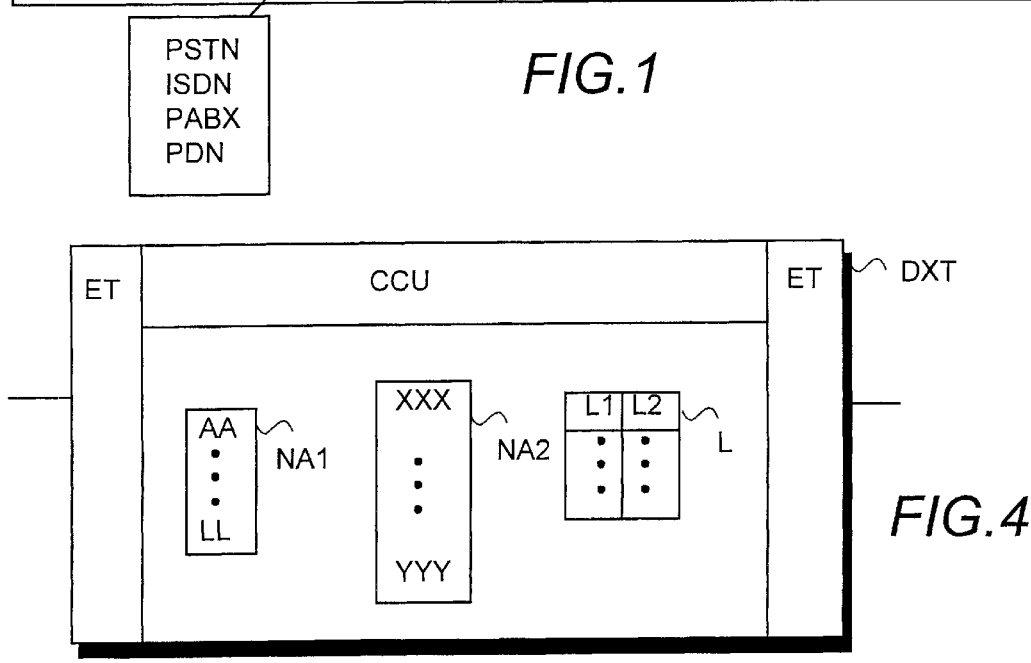
Figure 2:
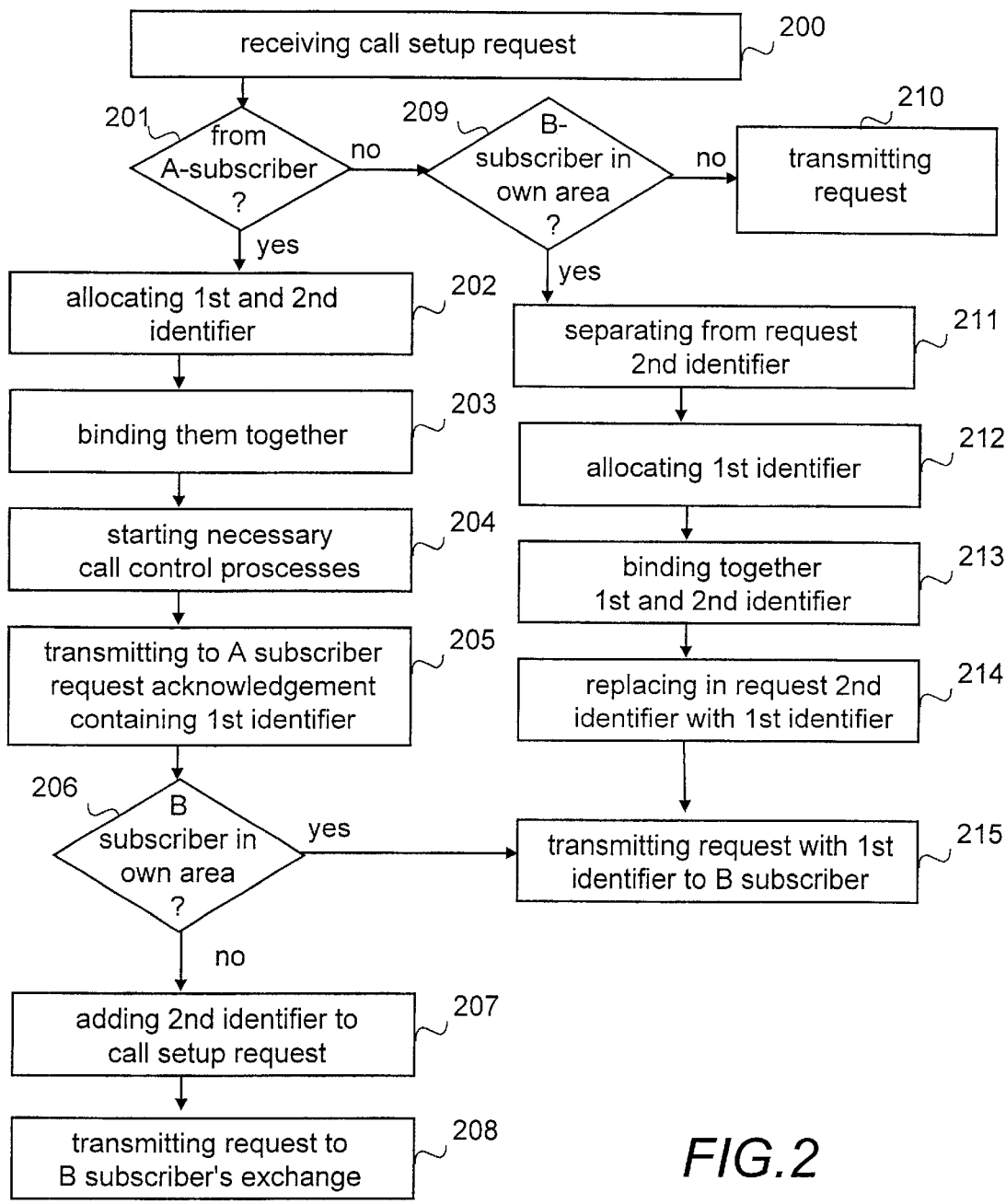
Figure 3:
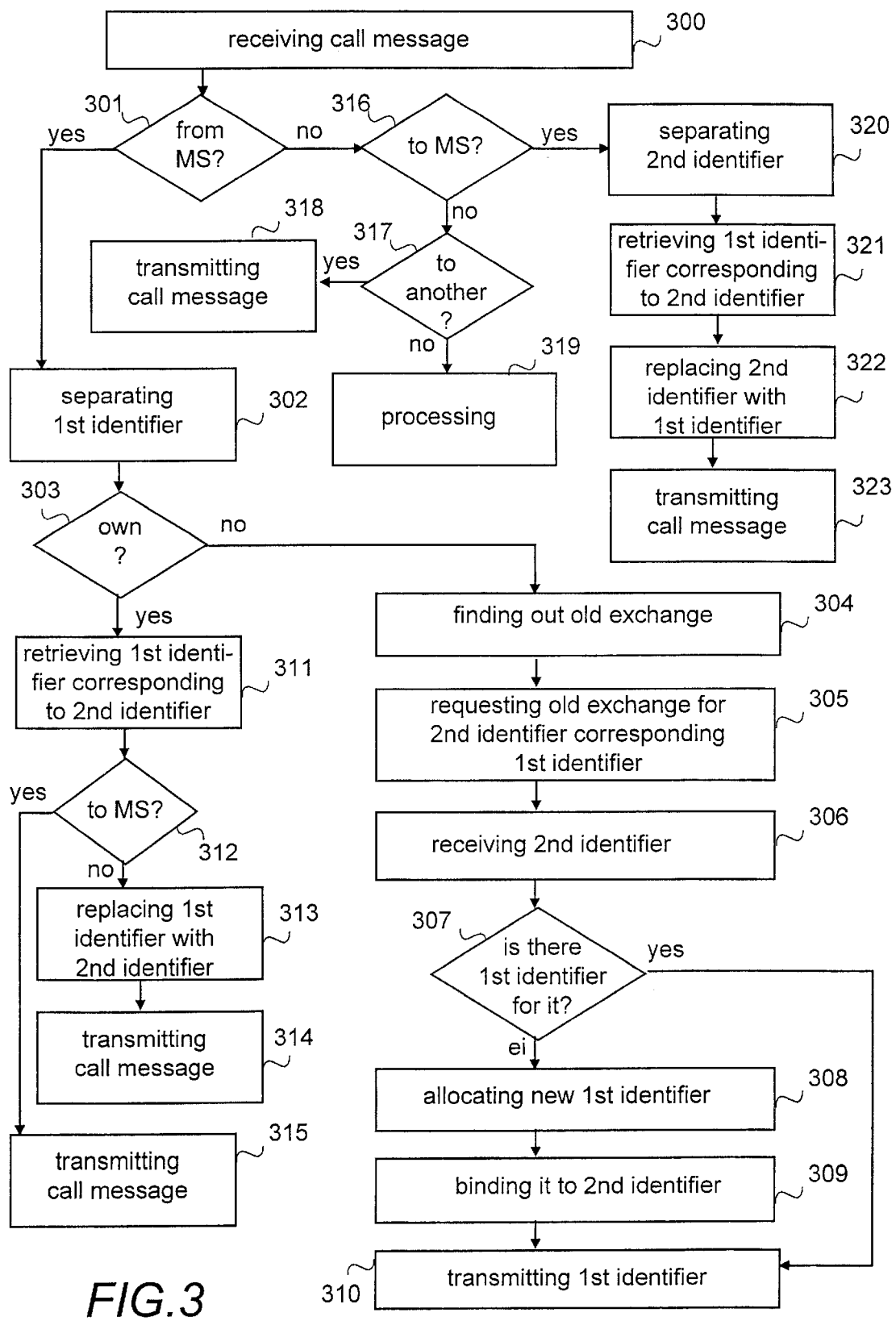

The invention is now described in closer detail in connection with the preferred embodiments with reference to the accompanying drawings, in which FIG. 1 shows a simple block diagram of a mobile communication system in accordance with the invention, FIGS. 2 and 3 show a flow diagram of a first preferred embodiment of the invention, and FIG. 4 shows a simple block diagram of a network node in accordance with the invention.

DETAILED DESCRIPTION OF THE INVENTION

The invention will be described in the following by way of example assuming that the telecommunications system is in accordance with the TETRA standard, which defines open interfaces, such as radio interfaces and interfaces to other TETRA networks. The length of the call identifier which identifies the call used on the interfaces is defined in the standard. The inner structure of the network is not defined in the standard. The invention is not, however, restricted to radio networks or other wireless networks but it is obvious to those skilled in the art how the invention can be applied to other telecommunications systems both in networks based on wireless data transfer and in fixed networks.

FIG. 1 shows an example of the structure of a telecommunications system 1 according to the TETRA standard. Since the inner structure of the switching and management infrastructure SwMI is not defined in the TETRA standard, only one solution example is shown herein. The network switching and management infrastructure is also referred to as a transmission network below. A mobile station MS communicates with a base station BS via a radio interface AI. Each base station BS is connected to a digital exchange for TETRA DXT in the fixed transmission network SwMI via a connection line. The digital exchanges for TETRA DXT are connected via a fixed connection to other exchanges DXT and to a digital central exchange for TETRA DXTc, which is an exchange to which other digital exchanges DXT and/or other digital central exchanges DXTc are connected in order to produce alternative traffic routes. In this example, an interface ISI between two TETRA networks is positioned in connection with the digital central exchange DXTc, but it can also be located at other exchanges DXT. External interfaces 3, defined by the standard, to a public switched telephone network (PSTN), to an integrated services digital network (ISDN), to a private automatic branch exchange (PABX) and to a packet data network (PDN) are positioned in connection with one exchange DXT in the present example, but they can also be located at each exchange. Similarly, an interface 5 between a dispatcher unit DU or other devices 4 connected to the network by a fixed connection and the telephone exchange DXT can be located either in connection with each exchange or, in accordance with the present example, at one exchange. The TETRA transmission network further comprises other open interfaces and peripherals, such as network control systems with their interfaces, which are not shown in the figure.

As subscriber registers, the system 1 further comprises at least a home location register HLR and a visitor location register VLR, which are not shown in FIG. 1. Subscriber information are permanently stored in the home location register HLR of the system and temporarily in the visitor location register VLR in whose area the mobile station MS happens to be at a given moment. The two registers can be separate network elements, registers being distributed to the exchanges DXT or digital central exchanges DXTc, or registers integrated with one of the exchanges in a centralized manner. It is essential that the subscriber information required by routing, for instance, can be found in the network.

In the example shown in FIG. 1, the transmission network SwMI is divided into three sub-networks 21, 22 and 23. This division into sub-networks is to ensure that a call identifier, i.e. a first identifier, is sufficiently long to identify a necessary number of calls. Hence, each exchange has its own sub-network in the example of FIG. 1. The advantage of this is that it is easier to allocate the call identifier values used on the interfaces in a decentralized manner at each exchange. The call identifier space can be divided between these adjacent sub-networks such that that the same value of the call identifier, i.e. the first identifier, is not used in adjacent networks. This can be realized for instance by providing each exchange DXT with a specific, fixed part of the number space allocated to the call identifier. Alternatively, the digital central exchange DXTc for instance is responsible for allocating the call identifier values such that the same call identifier value is not in use in adjacent networks simultaneously. The same call identifier value can, however, be used in sub-networks that are not adjacent. For example in the case of FIG. 1, the same call identifier values can be used in the sub-network (not shown in the figure) located on the right side of the sub-network 23 as in the sub-network 22. In large networks, the above ways of allocating numbers can be combined and the number allocation can be performed hierarchically.

The internal identifier used in the network is determined to be sufficiently long for identifying the call in the whole network area. The operator can freely determine the length of the internal identifier on the basis of the network size, number of sub-networks, exchange capacity and number of estimated simultaneous calls. The operator can readily change the sub-network division by means of the network management system.

A mobile communication system implementing the functionality according to the present invention comprises, in addition to means necessary for prior art allocation, selection and transmission of call identifier values, means for allocating the value of the internal identifier and binding the identifier values together, and means for replacing the identifier values in the messages. Furthermore, the system is arranged to use the internal identifier in the network in exactly the same way as the call identifier is used in the network in the prior art solutions. On open interfaces, the call identifier is used as in the prior art. The means implementing the functionality of the invention are preferably located in connection with the exchange DXT. The means or some means can also be located elsewhere, for example at the base station BS or at the digital central exchange DXTc. Allocation is used herein to refer to allocating a completely new value or checking whether a value that is already in use can still be used.

The flow diagram of FIG. 2 shows how an exchange DXT operates in connection with call setup in accordance with a first preferred embodiment of the invention. For the sake of clarity, it is assumed that A and B subscribers are not engaged in other calls simultaneously. If the subscriber is engaged for instance in two different calls, the terminal receives call messages belonging to two different calls. Both calls have a unique call identifier, in other words the subscriber receives messages with two different identifiers and correspondingly, equips outgoing messages with one of the identifiers according to with which one of the calls the message is associated. In other words, messages associated with a particular call are received and transmitted with an identifier only associated with this particular call. The invention does by no means prevent the subscriber from being engaged in a plurality of calls simultaneously, and furthermore, the same subscriber can both be the A subscriber, i.e. the caller, and the B subscriber, i.e. the called party.

In the first preferred embodiment of the invention, both allocating the identifier values and binding them together take place at the exchange, which has a given number of call identifier values and a given number of internal identifier values available. In this embodiment, it is assumed that the base stations only transmit the messages and do not process them at all, in which case the internal identifier is only used at the exchange and between the exchanges.

In the first preferred embodiment the service area of each exchange forms a sub-network- in the area of which the call identifier identifies the call on the interfaces, the call identifier values of the adjacent sub-networks thus being different.

In FIG. 2, the exchange receives a call setup request at point 200. At point 201 it is checked whether the call setup request is received from the A subscriber via an open interface or from another exchange of the network. The A subscriber is the caller, and the call can be placed from a mobile station, in which case the call setup request comes through the base station via an air interface. The A subscriber can also place the call from another TETRA network's area, in which case the call setup request comes via an ISI interface. Similarly, the A subscriber can connect to the network via other open interfaces. If the call setup request is received from the A subscriber, a call identifier value, i.e. the first identifier value used on the interface for identifying the call and an internal identifier value, i.e. the second identifier value, for identifying the call in the network are allocated to the call at point 202 using identifier allocation procedures. As distinct from the prior art, the procedures have to be responsible for a value being allocated to the first identifier and the second identifier. These values are totally independent from each other. After allocating the identifier values, the first identifier value is bound to the second identifier value at point 203. Next, at point 204, the necessary call control processes are initiated in a known manner, the processes being responsible for further necessary call control processes in a known manner during the call. The difference from the prior art is that the call control processes identify the call on the basis of the internal identifier value, i.e. the second identifier value. The prior art, on the other hand, uses the call identifier value, i.e. the first identifier value, to identify the call. A call setup request acknowledgement which contains the call identifier value, i.e. the first identifier value, is transmitted to the A subscriber at point 205. In accordance with the prior art, the A subscriber separates the first identifier value from the message, stores the value in memory and shall transmit all call messages equipped with the first identifier value in future. Correspondingly, the A subscriber receives only those messages that contain the first identifier value. At point 206 it is checked whether the B subscriber is located in the exchange's own service area. The B subscriber is the called party. If the B subscriber is located in the exchange's own service area, a call setup request containing the first identifier value is transmitted to the B subscriber at point 215. In the first preferred embodiment, the value is the same as was allocated at point 202. In some other embodiments, a unique first identifier value which is bound to the second identifier value even when the subscribers are located in the same sub-network and/or in the same exchange's area can also be allocated to the B subscriber. Using the same first identifier value saves exchange resources, however. Next, a reply is awaited from the B subscriber, the reply being dependent for instance on the type of the call and the fact whether the B subscriber answers the call. The reply is already a call message containing the first identifier value transmitted to the B subscriber. The call message process is described in closer detail in connection with FIG. 3.

If it is detected at point 206 that the B subscriber is not located in the exchange's own area, the second identifier value is added to the connection set-up request at point 207. The difference from the prior art is that instead of the first identifier value it is the second identifier value that is added to the request. After the addition, the call setup request is transmitted at point 208 towards the exchange of the area where the B subscriber is located in accordance with the prior art. Next, a reply is awaited from the B subscriber as described above.

If at point 201 it is detected that the call setup request is received from another exchange, it is checked at point 209 whether the call setup request is directed to the B subscriber in the exchange's own service area. If not, the call setup request is forwarded in a known manner at point 210.

If at point 209 it is detected that the request is directed to the B subscriber in the exchange's own area, the second identifier value is separated from the call setup request at point 211, the first identifier value is allocated to the request at point 212 and the first identifier value is bound to the second identifier value at point 213. Next, the second identifier value included in the call setup request is replaced with the first identifier value at point 214 and the call setup request containing the first identifier value is transmitted to the B subscriber at point 215. The value is the same as was allocated at point 212. Next, a reply is awaited from the B subscriber as described above.

The flow diagram of FIG. 3 shows how an exchange DXT operates during a call in accordance with the first preferred embodiment of the invention. In the initial situation at point 300 a call message is received either from the A or B subscriber. Since it is irrelevant from which one the message is received, a subscriber terminal is used to denote the subscriber. In the present example, both the A and B subscribers have a mobile station MS as the terminal. It is assumed that the mobile stations are located in the same network area, but the mobile station can also be located in another TETRA network, in which case the interface is the ISI. The subscriber can also use another terminal, the interface thus being dependent on the terminal and the network in which the terminal is located. The call message can be either a message containing actual data or a signaling message being associated with cell reselection, for example.

At point 301 it is checked whether the call message is received from the mobile station MS. If the message is received from the mobile station via the base station, the call identifier value, i.e. the first identifier value, used on the air interface is separated from the message at point 302. Next, at point 303, it is checked whether the first identifier belongs to the given numbers of call identifier values of the exchange. If not, it is unknown to the exchange. In the first preferred embodiment wherein a particular group of unique identifiers is determined for each exchange, it can already be detected from the first identifier value whether an identifier belongs to this group. If identifiers are allocated to different exchanges such that no adjacent exchanges have the same first identifier values, the check at point 303 is performed by examining those lists in which the identifier values are bound together. If, on the other hand, adjacent exchanges have the same first identifier values in use, the check at point 303 is performed by utilizing, in addition to the first identifier value, further information included in the call message, such as the telephone number.

If it is detected at point 303 that the identifier is not the exchange's own identifier, the mobile station has performed cell reselection between exchanges where it moves from the source cell to the calling channel of the target cell and requests for a call restoration. Such handovers include for intsance unannounced cell reselection and type 2 and type 3 announced cell reselection defined in the TETRA standard. Hence, the call message received at point 300 is the call return request. Then at point 304 the old location exchange of the mobile station is found out from the call message for instance on the basis of the old location area included in the return request. The old location exchange can also be found out by means of the home location register or the visitor location register utilizing the telephone number. Instead of the old exchange, or together with it, also the source cell the mobile station has left can be found out in the same way as the old exchange. In embodiments wherein each cell uses unique first identifier values, to find out the old exchange is insufficient but the source cell must also be found out. To find out the source cell also means to find out the old exchange. Next, at point 305, the old exchange is requested for the second identifier value, i.e. the internal network identifier value, corresponding to the first identifier value. At point 306, the second identifier value and other necessary information on the call are received from the call control centre, simultaneously being responsible, according to the prior art, for creating for instance necessary call control processes for the exchange. The difference from the prior art is that the second identifier value is utilized to identify the call. The call control processes in themselves remain unchanged. The call control centre is the exchange where the main call control processes are located. This centre can be any exchange and it can change during the call as a result from the subscriber moving around in the area. Alternatively, the control centre is the exchange via which the connection is established. The control centre is also called a home mobile services switching centre. If the old exchange is not the control centre, the old exchange informs the control centre that the exchange has been changed. On account of this information, the control centre can transmit the information received at point 306. These prior art procedures are not shown in FIG. 3, however. After point 306, it is checked at point 307 whether the first identifier value has already been bound to the second identifier value. If not, the first identifier value is allocated to the call at point 308 and it is bound to the second identifier value at point 309. If the first identifier value has already been bound to the second identifier value, a new value is not allocated to it in the first preferred embodiment but, in accordance with the prior art, the same first identifier value is used for all terminals engaged in the call located in the same exchange area. When the new first identifier value is known, it is transmitted to the mobile station MS at point 310 in the call message. This message transmitted at point 310 is transmitted using the first identifier value of the old exchange to enable the mobile station to pick it up. The first identifier value of the old exchange is the value separated at point 302. After point 310, call messages are transmitted to and from the mobile station using the new first idehtifier value.

If, on the other hand, it is detected at point 303 that the identifier belongs to the exchange's own identifiers, the second identifier value corresponding to the first identifier value is retrieved at point 311. Next, it is checked at point 312 whether the call message is directed to another mobile station MS engaged in the call in the service area of the same exchange. If so, the information required by the call control processes is updated using the second identifier and the call message equipped with the first identifier is transmitted at point 315. The call message can be any call message which is transmitted to the mobile station MS and processed at the call control. If it is detected at point 312 that the message will not next be transmitted to the mobile station, the first identifier value included in the call message is replaced with this second identifier value at point 313. The message is now identified by the second identifier, i.e. the internal identifier of the network. Next, at point 314, the call message is forwarded to be processed by the call control, after which the message may be further forwarded to another exchange. In the first preferred embodiment, an announced type 1 cell reselection message defined in the TETRA standard is supplied to the other branch and the information on the type 1 cell reselection with the necessary information is transmitted to the other exchange. In the type 1 cell reselection the mobile station moves directly from the source cell to the target cell and to the connection allocated for the mobile station in the target cell to continue the call. Cell reselection of the GSM (Global System for Mobile Communication) system is always as described herein, similarly to cell reselection in the third generation mobile communication system being developed. In the first preferred embodiment it is assumed that the call control centre is located at the old exchange, in which case, in addition to points 313 and 314, the call control arranges cell reselection in accordance with the prior art. Furthermore, it is responsible for the allocation of the new first identifier value at the new exchange by transmitting a call message requesting for instance for a new first identifier value to the new exchange at point 314. The call control centre can also be some other exchange.

If it is detected at point 301 that the call message is received from some other exchange than the mobile station MS, it is checked at point 316 whether the call message is transmitted from this exchange to the mobile station MS. If the call message is not transmitted to the mobile station, it is checked at point 317 whether the message is transmitted to another exchange DXT. If so, the receiving exchange is only a transmission exchange and at point 318 the call message is transmitted as such to the next exchange. If the message is intended for the exchange itself, the message is an internal call control message, which is processed at point 319. A reply message can be transmitted to the internal message, or further, an internal message can be transmitted to another exchange. If the message is directed towards the service area of the exchange in question and associated with cell reselection, the message requesting for instance for the new first identifier value, the second identifier value is separated at this point and the new value is allocated as shown for instance at points 307 to 309, and the new first identifier value is transmitted in the message to the call control centre and/or via the call control centre to the old exchange. If, on the other hand, the received message requests for the second identifier value corresponding to the first identifier value, the second identifier value is found out and preferably attached to the unannounced cell reselection messages. One such message is a message whereby the old exchange informs the call control centre that the subscriber has moved to another exchange's area.

In connection with cell reselection, the call control centre is informed of the procedure in a known manner, after which the call control centre initiates the necessary call control processes at the target exchange and transmits the necessary information. The difference from the prior art is that the second identifier value, i.e. the internal identifier value, is utilized to identify the call. The call control procedures in themselves remain unchanged; these known procedures are not shown in FIG. 3, however.

If it is detected at point 316 that the received call message is transmitted from this exchange to the mobile station MS, the second identifier value is separated from the message at point 320, the first identifier value corresponding to the second identifier value is retrieved at point 321, and the second identifier value included in the message is replaced with the first identifier value at point 322. Next, at point 323, the call message is transmitted through the base station via an air interface to the mobile station.

If the received call message is an indication or acknowledgement message of the type 1 announced cell reselection containing the new value for the first identifier, the new value is copied before the call message is transmitted to the mobile station at point 323 in the first preferred embodiment. At point 323, the new first identifier value is transmitted to the mobile station in the message utilizing the old first identifier value to identify the air interface. In this embodiment, the exchange replaces the first identifier value in the memory with the new copied first identifier value after the transmission and next, transmits a command to the mobile station to move to the target cell. The command utilizes the new copied value as the identifying first identifier value since the mobile station replaces the first identifier value with the new value transmitted at point 323 and will no longer identify messages with the old value as transmitted to itself. In other embodiments, it is possible to maintain for instance in the mobile station two different first identifier values during cell reselection. After cell reselection at the latest, call messages are transmitted to and from the mobile station only using the new first identifier value.

FIG. 3 also shows how, in accordance with the first preferred embodiment, cell reselection is not performed between the cells of the exchange. In the first preferred embodiment, cell reselection taking place in the exchange does not result in the allocation of the new first identifier value since the same value is used in the whole area of the exchange. It is obvious to those skilled in the art how this operation in the exchange is arranged in the first preferred embodiment and also in other embodiments of the invention in which for instance cell reselection always triggers the allocation of a new first identifier value. It is essential that the first identifier value is used on the interfaces to identify the call while the second identifier value is used to identify the call in the network, including call control. A new value must be allocated to the first identifier whenever the sub-network changes. Depending on the embodiment and the sub-network division, a new value can be allocated to the first identifier in connection with each cell reselection or each cell reselection between the ecxhanges. Depending on the embodiment, the first identifier value is always transmitted in cell reselection acknowledgement messages and call-return request acknowledgements, or only when the first identifier value is changed.

FIG. 3 does not show in detail messages associated with cell reselections according to the TETRA standard but they are included for instance in points 305, 306 and 319. Based on what has been explained above, however, it is obvious to those skilled in the art how the messages are processed at the new and the old exchange and the call control centre. According to the invention, the second identifier, which is identified by the old exchange, is utilized to identify the call between these three different exchanges. If the exchange does not know the second identifier value, it transmits a message requesting for the second identifier value, equipped with an identifier by means of which the exchange is able to identify the reply.

Furthermore, the invention is no by means related to factors that trigger cell reselection nor whether the mobile station or a network element makes the decision about cell reselection. The invention can also be readily applied to systems that do not allow cell reselection; in such a case, the points related to cell reselection described in connection with FIG. 3 are simply ignored.

The points described above in FIGS. 2 and 3 are not in an absolute chronological order, and some points can be performed simultaneously or in a different order. Between the points, other functions related to routing, resource management and creating and transferring call control procedures, for example, can also be performed; some points can also be ignored. It is essential that the identifier values are allocated and replaced with each other.

As can be seen from the above description, each call subscriber (the caller i.e. the A subscriber and the called i.e. the B subscribers) despite being involved in the same call can have a different call identifier value, i.e. the first identifier value depending on the location. For each call, however, there is only one second identifier value, i.e. the internal network identifier value. This second identifier is utilized for instance to control the call and to collect information on the call. The call identifier, i.e. the first identifier, is always utilized to identify the call on the interfaces. Furthermore, the call subscribers can freely move in the system area, the first identifier value used on the interface being changed in the middle of the call as described above while the second identifier value remains unchanged.

For the sake of clarity, it has been assumed above that only two terminals are engaged in the call. However, it is obvious to those skilled in the art that the method of the invention can also be applied to group calls; terminals belonging to the same group and located in the same area are preferably provided with the same first identifier value. However, the invention can also be applied although each subscriber engaged in the call is provided with a unique first identifier value independent from the other first identifier values.

Furthermore, it is assumed above that in connection with cell reselection, the identifier values are transmitted in messages that are associated with cell reselection although no values are transmitted in the messages in the prior art. The advantage of this is that no extra signaling load is caused by transmitting and changing the identifier values. Identifier values can also be transmitted by signaling only assigned to the particular task, the network signaling load thus being increased, however.

FIG. 4 shows a block diagram of a network node in accordance with the invention in the first preferred embodiment. The network node in the example is a digital exchange for TETRA DXT which is connected to other exchanges and a mobile station via a base station. The exchange can also be connected to a fixed terminal and/or another network.

The network node DXT comprises exchange terminals ET for transmitting messages to the output channel and for receiving messages from the input channel via various interfaces. There can be a plurality of output and input channels.

The network node further comprises a call control unit CCU, which is responsible for call control and resource management. The call control unit CCU controls message transmission and reception via the exchange terminals ET. In the first preferred embodiment, the call control unit CCU detects on the basis of the interface used whether it receives the message from another exchange, a mobile station, another TETRA network, other networks or a fixed interface. The origin of the call message received can be also found out on the basis of the length of the identifier included in the message; messages received via an interface contain either the short i.e. the first identifier or no identifier at all, while a message received from another exchange contains the long i.e. the second identifier. After receiving the message the call control unit CCU finds out whereto the message is to be routed and performs the necessary identifier separations, checks, changes and allocations as described above in connection with FIGS. 2 and 3. Various processes, such as resource management processes, message transmission processes and call control processes, are created in the call control unit in a known manner for these functions. The message transmission processes are responsible for the exchange's inner functions, informing the call control processes and the interface processes, for example. The call control processes are responsible for the inner call control of the exchange and the call control between the exchanges, for instance. The resource management processes are responsible for example for allocating and releasing various resources necessary for the call. In the typical solutions, the call control process requests the resource management processes for the allocation and release of the first and second identifier.

In order to change identifiers, the call control unit CCU can for instance maintain a reservation list L which contains a second identifier value L2 corresponding to each allocated first identifier value L1. Alternatively, a list of the first identifier values bound to the second identifier value could be maintained for each allocated second identifier value. The allocation list L may also include further information. Other ways can also be utilized to bind the value or values of the call identifier, i.e. the first identifier to the value of the internal identifier, i.e. the second identifier. The allocation list can also be located at another network node, in which case the call control unit interrogates and updates the network node where the allocation list is located as necessary.

In the first preferred embodiment the network node further comprises a number space NA1, which is part of the number space determined for the first identifier in the system specifications, and which is allocated to the first identifier. Another network node may also comprise the same number space NA1 as allocated to the first identifier. In some embodiments the number space NA1 may comprise the entire number space determined for the first identifier. Additionally, in the first preferred embodiment, the network node comprises a number space NA2, which is part of the number space determined for the second identifier. Those internal identifier values, i.e. the second identifier values that are included in the number space NA2 determined for the second identifier cannot be included in the number space determined for any other second identifier of the network node in the same network. In some embodiments the number space determined for the internal identifier is not allocated as described above but it is maintained in a centralized manner. The number space NA1 is used for allocating the first identifier values in connection with call setup and cell reselection. The number space NA2 is used only for allocating the second identifier value at the A subscriber exchange in connection with call setup.

In other embodiments of the invention, the network nodes do not necessarily have all elements and functions described above, or, alternatively, the functions may be more versatile. It is irrelevant for the solutions of the invention how the processes and/or functions are located among the network elements or other units and how they are logistically distributed. It is sufficient for the system of the invention that it comprises at least one network element with information about free first identifier values of the sub-network, free second identifier values in the whole network, and the first identifier values bound to each allocated second identifier value. This identification information can also be decentralized in a plurality of network elements. Additionally, at least one network element must be able to transmit call messages via an open interface in such a way that the first identifier is utilized for call identification while the second identifier is utilized for call control and identification within the network. The identification information can be maintained either in a centralized or decentralized manner.

The invention does not necessitate any modifications in a mobile station in accordance with the TETRA standard, since according to the standard definitions it is able to replace the call identifier value with a new one if it receives the value in certain messages. If the mobile station in accordance with the applied system does not support changing the identifier value, the mobile station can be arranged to change the identifier value by updating the control routines of the mobile station. In some embodiments, after unannounced cell reselection the mobile station can also be arranged to withdraw from transmitting and receiving messages except an acknowledgement of a call return request transmitted on the control channel, which acknowledgement provides the mobile station with a new first identifier value and in which the mobile station is directed to the traffic channel. After receiving the acknowledgement message the mobile station is again able to transmit and receive messages using the new first identifier value. This can be implemented by software routines. It can thus be secured that the mobile station receives a correct call. The above explanation also applies to other terminals.

It is to be understood that the above description and the accompanying drawings are only intended to illustrate the present invention. It will be obvious to those skilled in the art that the invention can be varied and modified in many ways without departing from the scope and spirit of the invention disclosed in the attached claims.

What is claimed is:

1. A method for identifying a call in a telecommunications system comprising at least one network and terminals, the system determining at least one interface for the network, the interface being connected with the terminals or other networks via the interface, and a first identifier that is used on the network interfaces for identifying the call in call messages associated with the call, the method comprising:

dividing the network into smaller sub-networks such that the first identifier used on the interface is unique in the sub-network area;

determining a second identifier to be used for identifying the call in the whole network area;

allocating one value of the second identifier to the call in connection with call setup;

allocating one or more first values of the first identifier to the call in connection with call setup;

binding each first identifier value to the value of the second identifier;

replacing in call messages the value of the second identifier with a value of the first identifier before transmitting the message from the network via the interface; and replacing in the call messages received via the interface the value of the first identifier with the value of the second identifier in the network.

2. The method according to claim 1, wherein the network is a mobile communication network where at least some terminals are able to move in the network, the method further comprising:

triggering cell reselection from the source cell of the mobile communication network to the target cell;

allocating in the network a second value to the first identifier to be used as the first identifier value on the source cell interface;

receiving at the terminal a message from the network, the message containing the second value of the first identifier;

replacing the first value of the first identifier with the second value at the terminal; and performing cell reselection from the source cell to the target cell.

3. The method according to claim 1, wherein the network is a mobile communication network wherein at least some terminals are able to move in the network, the method further comprising:

performing cell reselection at the terminal from the source cell of the mobile communication network to the target cell;

transmitting from the terminal to the network a call return request indicating the source cell and containing the first value of the first identifier;

interrogating a value of the second identifier corresponding to the first value of the first identifier at the source cell;

allocating in the network a second value to the first identifier to be used on the target cell interface;

receiving at the terminal from the network a message containing the second value of the first identifier; and replacing the first value of the first identifier with the second value at the terminal.

4. The method according to claim 2, further comprising checking before allocating the second value of the first identifier whether the cell reselection takes place in the sub-network, and if so, using the first value of the first identifier.

5. The method according to claim 1, wherein the values of the first identifier are allocated such that the first identifier values of adjacent sub-networks differ from each other.

6. The method according to claim 1, wherein a unique number space is determined for each sub-network for the first identifier such that the unique number spaces of the adjacent sub-networks differ from each other.

7. The method according to claim 1, wherein the telecommunications system is a system according to the TETRA standard, the network is a network according to the TETRA standard, and the first identifier is a call identifier defined in the TETRA standard.

8. A telecommunications system comprising at least one network for receiving and transmitting call messages associated with a call, the network comprising:

first allocation means for allocating a first value of a first identifier in connection with call setup, the first identifier being used for identifying the call on an interface and a number space of the first identifier being predetermined;

transmission means for transmitting the first identifier to a terminal in connection with call setup;

terminals connected to the network via the interface and receiving in connection with call setup the first value of the first identifier from the network and transmitting to the network call messages associated with the call and equipped with the first identifier value and receiving from the network call messages, the first identifier value included in the messages being the same as the first identifier value in the terminal, wherein the first allocation means is arranged to allocate the first value of the first identifier for each terminal or group of terminals engaged in the call, the first identifier values are different from each other or are identical to each other, and the network further comprising:

at least two sub-networks, wherein being large enough in the area of each sub-network the number space of the first identifier is large enough to identify the calls on the interface;

second allocation means for allocating a second identifier value from a number space determined for a second identifier in connection with call setup for identifying the call in whole network;

call control means for controlling the call and for collecting information about the call on a basis of the second identifier value;

memory means for binding each first identifier value to the second identifier value; and replacement means for replacing the second identifier value in the call message with the first value when the message is transmitted from the network to the terminal, and for replacing the first identifier value with the second identifier value in the call message received from the terminal.

9. The telecommunications system according to claim 8, wherein the network is a mobile communication network, at least some terminals are able to move in a network area, the call control means are arranged to request the first allocation means for a new first identifier value in response to triggering of cell reselection of the terminal engaged in the call from the source cell of the mobile communication network to a target cell, the first allocation means are arranged to allocate a second value to the first identifier in response to the request from the call control means;

the transmission means are arranged to transmit the second value of the first identifier to the terminal; and the terminal is arranged to replace the first value of the first identifier with the second value.

10. The telecommunications system according to claim 9, wherein the replacement means are arranged to detect triggering of cell reselection in response to a message received in the target cell, the first identifier value of the message being unknown in the target cell, and to separate from the message information on a source cell and to inform the call control means of cell reselection being triggered, the first identifier value and the source cell, and the call control means are arranged to interrogate the second identifier value corresponding to the first identifier value in the source cell.

11. The telecommunications system according to claim 8, wherein at least one of the terminals engaged in the call is connected to the network via an interface between networks.

12. The telecommunications system according to claim 8, wherein the telecommunications system operates according to the TETRA standard, the network operates according to the TETRA standard, and the first identifier is defined according to the TETRA standard.

13. A network node of a network in a telecommunications system, the network node comprising:

at least one input channel and one output channel;

reception means for receiving call messages associated with a call; and transmission means for transmitting the call messages associated with the call towards a target address, wherein the network node is arranged, in response to a call setup request received from a terminal, to allocate a value of a first identifier to each terminal or group of terminals engaged in the call in a network node area to be utilized in identifying the call on an interface between the network and the terminal, allocate a value of the second identifier to the call for identifying the call in the network, bind each first identifier value to the second identifier value, initiate call control using the second identifier value; replace the second identifier value in the call message with the first identifier value before the message is transmitted to the terminal, and replace the first identifier value received from the terminal in the call message with the second identifier value before the message is transmitted to the network.

14. The network node according to claim 13, wherein the network node is in a mobile communication network, and is arranged to allocate a value to the first identifier in connection with cell reselection if a target cell of a cell reselection is located in a network node area.

\* \* \* \* \*